United States Patent
Dotson et al.

(10) Patent No.: US 9,393,835 B2
(45) Date of Patent: Jul. 19, 2016

(54) ANNULAR STRUCTURE HAVING MULTIPLE REINFORCEMENT BANDS

(75) Inventors: Michael Edward Dotson, Greenville, SC (US); Jim Endicott, Greenville, SC (US); Patrick A. Petri, Greer, SC (US); Kirkland W. Vogt, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 243 days.

(21) Appl. No.: 13/977,465

(22) PCT Filed: Sep. 9, 2011

(86) PCT No.: PCT/US2011/050905
§ 371 (c)(1),
(2), (4) Date: Jun. 28, 2013

(87) PCT Pub. No.: WO2012/091762
PCT Pub. Date: Jul. 5, 2012

(65) Prior Publication Data
US 2013/0278045 A1    Oct. 24, 2013

Related U.S. Application Data

(60) Provisional application No. 61/428,074, filed on Dec. 29, 2010.

(51) Int. Cl.
*B60C 7/10* (2006.01)
*B60B 9/26* (2006.01)
(Continued)

(52) U.S. Cl.
CPC . *B60B 9/26* (2013.01); *B29D 30/02* (2013.01); *B60B 1/06* (2013.01); *B60C 7/00* (2013.01); *B60C 7/105* (2013.04); *B60C 7/22* (2013.01); *Y10T 29/49538* (2015.01)

(58) Field of Classification Search
CPC .............. B60B 1/06; B60B 1/08; B60B 9/00; B60B 9/02; B60B 9/26; B29D 30/20; B29D 30/244; B29D 30/02; B60C 7/00; B60C 7/10; B60C 7/102; B60C 7/105; B60C 7/14; B60C 7/16; B60C 7/18; B60C 7/20; B60C 7/22
USPC ......... 152/5, 246, 323, 326, 328, 196, 197, 7, 152/11, 12, 69, 80
See application file for complete search history.

(56) References Cited

U.S. PATENT DOCUMENTS 1,440,974 A    2/1923    Dornburgh
1,495,083 A    5/1924    Krusemark
(Continued)

FOREIGN PATENT DOCUMENTS

BR    199902986 A    3/2000
EP    0039658    11/1981
(Continued)

OTHER PUBLICATIONS

PCT International Search Report for PCT/US2011/030467, dated Jun. 13, 2011.
(Continued)

*Primary Examiner* — John Walters
(74) *Attorney, Agent, or Firm* — Dority & Manning, P.A.

(57) ABSTRACT

A non-pneumatic wheel with reinforcement bands that provide structural support for the wheel and a method of manufacture of such a wheel are described. The reinforcement band forms part of an annular reinforcement structure that includes a core that is cast in place between annular reinforcement bands. The core can be impregnated with a matrix material. The matrix material can also be used to form one or more elements of the non-pneumatic wheel.

20 Claims, 8 Drawing Sheets

(51) Int. Cl.
*B29D 30/02* (2006.01)
*B60C 7/22* (2006.01)
*B60B 1/06* (2006.01)
*B60C 7/00* (2006.01)

(56) References Cited

U.S. PATENT DOCUMENTS

| | | | |
|---|---|---|---|
| 2,388,421 | A | 11/1945 | Kraft et al. |
| 3,779,835 | A | 12/1973 | Lohr et al. |
| 3,973,613 | A | 8/1976 | Marzocchi |
| 4,024,895 | A | 5/1977 | Barron |
| 4,073,330 | A | 2/1978 | Allard |
| 4,235,270 | A * | 11/1980 | Kahaner ............... B60B 9/12 152/326 |
| 4,428,411 | A | 1/1984 | Markow |
| 4,734,144 | A | 3/1988 | Markow |
| 4,794,966 | A | 1/1989 | Markow |
| 4,966,212 | A | 10/1990 | Hill |
| 5,221,382 | A | 6/1993 | Sid-Ahmed |
| 5,265,659 | A | 11/1993 | Pajtas et al. |
| 5,565,257 | A | 10/1996 | Tingley |
| 5,837,077 | A | 11/1998 | Kabe et al. |
| 5,906,836 | A | 5/1999 | Panaroni et al. |
| 6,109,319 | A | 8/2000 | Gardetto |
| 6,422,279 | B1 | 7/2002 | Williams et al. |
| 6,460,586 | B1 | 10/2002 | Spragg et al. |
| 6,470,937 | B1 | 10/2002 | Spragg et al. |
| 6,701,987 | B1 | 3/2004 | Abbott |
| 6,769,465 | B2 | 8/2004 | Rhyne et al. |
| 6,792,986 | B2 | 9/2004 | Allen et al. |
| 6,994,134 | B2 | 2/2006 | Grah |
| 7,013,939 | B2 | 3/2006 | Rhyne et al. |
| 7,125,083 | B2 * | 10/2006 | Piumarta ............... A63C 17/223 152/323 |
| 7,363,805 | B2 | 4/2008 | Jayakumar et al. |
| 7,418,988 | B2 | 9/2008 | Cron et al. |
| 7,650,919 | B2 | 1/2010 | Rhyne et al. |
| 2004/0012246 | A1 | 1/2004 | Rhyne et al. |
| 2007/0267116 | A1 | 11/2007 | Rhyne et al. |
| 2008/0250843 | A1 | 10/2008 | Albohr et al. |
| 2008/0314486 | A1 * | 12/2008 | Manesh ............... B60C 7/14 152/328 |
| 2009/0071584 | A1 | 3/2009 | Zhang et al. |
| 2010/0018621 | A1 | 1/2010 | Thompsom |
| 2011/0024008 | A1 * | 2/2011 | Manesh ............... B29D 30/02 152/5 |
| 2011/0223366 | A1 | 9/2011 | Petri et al. |
| 2012/0031535 | A1 | 2/2012 | Thompson |

FOREIGN PATENT DOCUMENTS

| | | |
|---|---|---|
| EP | 0073313 A2 | 3/1983 |
| EP | 0353006 | 1/1990 |
| EP | 0400859 A2 | 12/1990 |
| EP | 0524002 B1 | 1/1993 |
| EP | 853009 A2 | 7/1998 |
| EP | 974449 A2 | 1/2000 |
| EP | 1772292 | 11/2007 |
| EP | 1980420 | 10/2008 |
| EP | 1980420 A1 | 10/2008 |
| GB | 1257017 | 12/1971 |
| JP | 6418117 | 1/1989 |
| JP | 2004051011(A) | 2/2004 |
| JP | 2007161054(A) | 6/2007 |
| WO | WO 94/11185 A1 | 5/1994 |
| WO | WO 99/55541 | 11/1999 |
| WO | WO 02/43974 A1 | 6/2002 |
| WO | WO 03/018332 A1 | 3/2003 |
| WO | WO 2005/007422 A1 | 1/2005 |
| WO | WO 2008/045098 A1 | 4/2008 |
| WO | WO 2008/050503 A1 | 5/2008 |
| WO | WO 2008/102048 A1 | 8/2008 |
| WO | WO 2008/118983 | 10/2008 |
| WO | WO 2009/005946 A1 | 1/2009 |

OTHER PUBLICATIONS

PCT International Search Report for PCT/US2011/050905, dated Jul. 14, 2008.
PCT International Search Report for PCT/US2011/042310, dated Nov. 3, 2011.
PCT International Search Report for PCT/US2009/060746, dated Jan. 12, 2010.
PCT International Search Report for PCT/US2011/042533, dated Dec. 6, 2011.
Plastic Processing Technology Handbook, Publication date: Jun. 12, 1995 p. 152-153 w/English Abstract.

* cited by examiner

United States Patent US 9,393,835 B2

ANNULAR STRUCTURE HAVING MULTIPLE REINFORCEMENT BANDS

PRIORITY CLAIM

This application claims the benefit of priority to U.S. Provisional Patent Application No. 61/428,074, filed Dec. 29, 2010, which is incorporated herein by reference for all purposes.

FIELD OF THE INVENTION

The subject matter of the present invention relates to a non-pneumatic tire having an annular reinforcement structure.

BACKGROUND OF THE INVENTION

The pneumatic tire is a known solution for compliance, comfort, mass, and rolling resistance; however, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Conventional solid tires, spring tires, and cushion tires, although lacking the need for maintenance and the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires.

Spring tires typically have a rigid wood, metal, or plastic ring with springs or spring-like elements connecting it to a hub. While the hub is thereby suspended by the springs, the inflexible ring has only a small contact area with the road, which offers essentially no compliance, and provides poor traction and steering control.

Accordingly, a non-pneumatic wheel and a process for manufacturing a non-pneumatic wheel having performance characteristics similar to a pneumatic wheel would be useful. More particularly, a wheel and a method for manufacturing a non-pneumatic wheel that does not require an air inflation pressure in order to provide performance characteristics of a pneumatic tire would be beneficial. Such a wheel, and a method of making such wheel, having a hub or capable of being connected to a hub for mounting on a vehicle or other transport device would also be very useful.

SUMMARY OF THE INVENTION

Aspects and advantages of the invention will be set forth in part in the following description, or may be obvious from the description, or may be learned through practice of the invention.

In one exemplary aspect, the present invention provides a method of manufacturing a non-pneumatic tire having an annular reinforcement structure that includes a first reinforcement band, a second reinforcement band, and a core positioned between the first and second reinforcement bands. The method includes the steps of providing the inner and outer reinforcement bands in a first mold with the inner and outer reinforcement bands positioned in concentric, spaced relationship so as to form an annular space between the inner and outer reinforcement bands; inserting material for the core into the first mold into the space between the inner and outer reinforcement bands so as to provide a casting that includes a core having a density of 0.75 $g/cm^3$ or greater that is located between the inner and outer reinforcement bands; placing the casting from said step of inserting into a second mold, the second mold providing at least one cavity for the molding of one or more features of the non-pneumatic wheel; and, introducing a matrix material in the second mold so as to form one or more features of the non-pneumatic wheel.

In another exemplary embodiment, the present invention provides a non-pneumatic wheel that defines radial and circumferential directions. The wheel includes an annular band for supporting a ground contacting tread portion where the annular band extends about the circumferential direction. An annular reinforcement structure is positioned within the annular band. The reinforcement structure includes an inner reinforcement band that extends along the circumferential direction; an outer reinforcement band extending along the circumferential direction and positioned radially-outside of said inner reinforcement band; and a core positioned at least partially between the inner and outer reinforcement bands. The core is constructed from a material that is formed in place between the inner and outer reinforcement bands and has a density of 0.75 $g/cm^3$ or greater. A mounting band is positioned radially-inward of the annular band. A plurality of web spokes are connected between the annular band and the mounting band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

The present invention provides a non-pneumatic wheel with reinforcement bands that provide structural support for the wheel and to a method of manufacture of such a wheel. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Inner and Outer Reinforcement Bands

Figure 1:
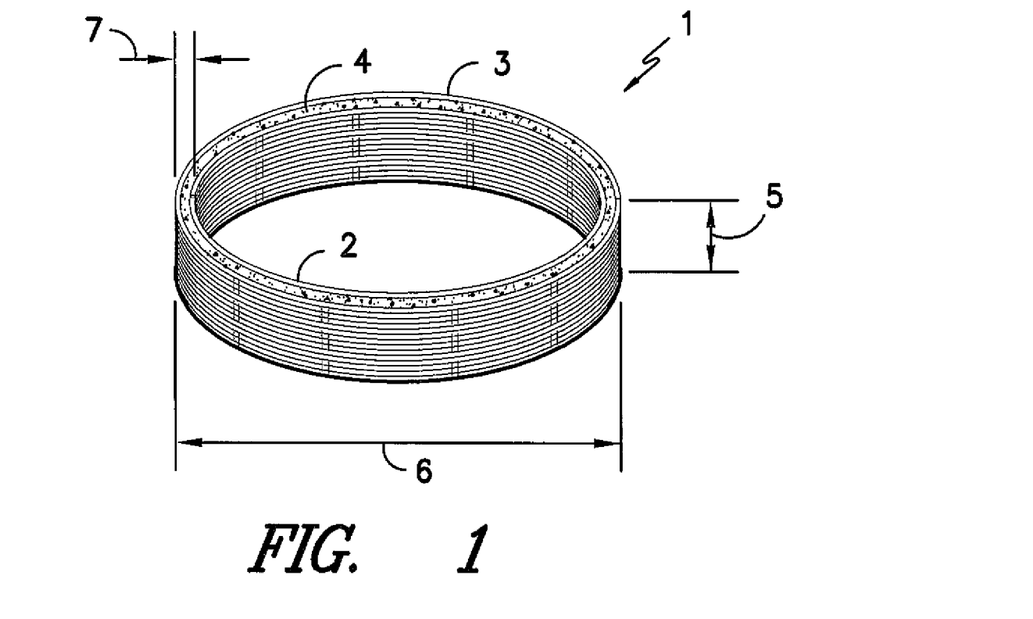
FIG. 1 provides a top perspective view of an exemplary embodiment of an annular reinforcement structure of the present invention.
Figure 2:
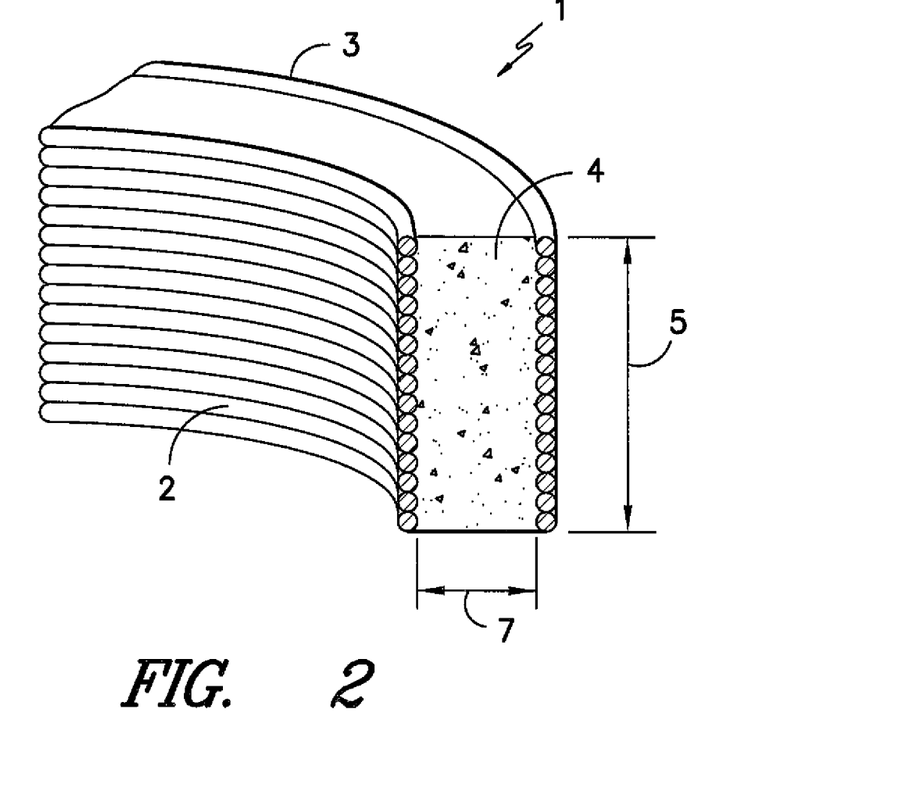
FIG. 2 provides a cut-away perspective view of the exemplary embodiment of FIG. 1.

Referring to FIGS. 1 and 2, an exemplary embodiment of an annular reinforcement structure 1 as may be used in a non-pneumatic wheel has as inner reinforcement band 2, an outer reinforcement band 3, and a cast-in-place core 4 made of a core material. Reinforcement structure 1 may be made with a range of dimensions. By way of example, the width 5 of annular reinforcement structure 1 may range from 1 cm to 2 meters, and the outside diameter 6 may range from 7 cm to 4 meters. By way of example, the distance between inner reinforcement band 2 and outer reinforcement band 3, that is, the thickness 7 of core material 4, may range from 2 mm to 25 min.

In various embodiments of the invention it is desirable to allow for relative movement of the inner and outer reinforcement bands 2 and 3 within annular reinforcement structure 1, such as may be created by flexing or shear force. In such circumstances, core material 4 may be provided with a minimum thickness (denoted by reference numeral 7) of 5 mm. Applications for the annular reinforced structure of the present invention, including suitable structures, alignment and spacing of the reinforcement bands, may be found in U.S. Pat. Nos. 6,769,465 B2 and 7,650,919 B2.

Each of the reinforcement bands 2 and 3 is a circular strip, characterized as being flexible in the radial direction and relatively inextensible in circumference. In one embodiment of the invention, reinforcement bands 2 and 3 are sufficiently flexible to be subjected to a bend radius that is one-tenth or less of the radius of the band when the band is oriented in the shape of a circle, and without experiencing a permanent set in the band. The inner and outer reinforcement bands 2 and 3 may be the same or different, both in terms of materials of construction and design.

By way of example, reinforcement bands 2 and 3 may be a woven or non-woven textile structure, arrangement of monofilament and/or multifilament cords, bi-component yarns, spun yarns, braided cords, single or multilayer sheets of polymers or metals, or a combination of the foregoing materials. By way of example, reinforcement bands 2 and 3 may be constructed of fiberglass, rayon, nylon, aramid, polyester, carbon or metal, such as steel. The materials may be treated to improve performance, allow for easier manufacturing and/or improve bond strength between materials. Examples include brass-plated steel, elastomer coated cords and the use of adhesion promoters, such as resorcinol-formaldehyde latex. Further examples of suitable reinforcement bands 2 and 3 may be found in belts for power transmission, hoses, tires, rollers, strapping and gaskets.

By way of further example, materials having a Young's modulus (GPa), of 35 or greater, or even 70 or greater, or even 210 or greater, are useful herein for construction of the reinforcement bands 2 and 3. Alternatively, the stiffness of the reinforcement bands 2 and 3 combined with the core material 4 may be characterized by a relative Young's modulus of 1,000:1 or even 10,000:1, respectively.

In one example, reinforcement bands 2 or 3 may be a monofilament or multi-filament cord wound into a helix and making at least three revolutions. The multiple windings of the cord may be held together by a yarn intertwined between adjacent cords, for example, by weaving or knitting, with the yarn arranged perpendicular to the cords. The intertwined yarn may include fibers that can be melted to fuse the structure together, thereby providing stability to the band, especially in the axial direction. Examples of useful reinforcement band structures may be found in pending U.S. patent application Ser. No. 12/661,196, filed Mar. 12, 2010, which is hereby incorporated by reference.

Also within the scope of the invention is the use of multi-ply reinforcement bands for either or both of bands 2 and 3. For example, layers of reinforcement material may overlay one another, perhaps joined by a suitable binder, adhesive or stitch bond. The plies may be oriented parallel to each other or at an angle, for example, by winding one ply around the other in a spiral. The multi-ply structures are considered as a single reinforcement band herein.

Reinforcement bands 2 and 3 may be impermeable to the material used for the core 4, when the core material is cast. The core material may be cast as a liquid reaction mixture, such as a reactive mixture of a polyol and a polyisocyante capable of forming a polyurethane. By way of further example, the core material may be in a melted state, such as a thermoplastic resin, or in a plastic state, such as an unset concrete. Thus, the structure of the reinforcement bands 2 or 3 can be selected based on factors such as the viscosity of the core material being cast and the surface interaction of the reinforcement band material and core material being cast, to render the reinforcement band 2 or 3 impermeable. Accordingly, the exterior side of one or both of the reinforcement bands 2 and 3 is uncoated by the core material.

Molds

Figure 3:
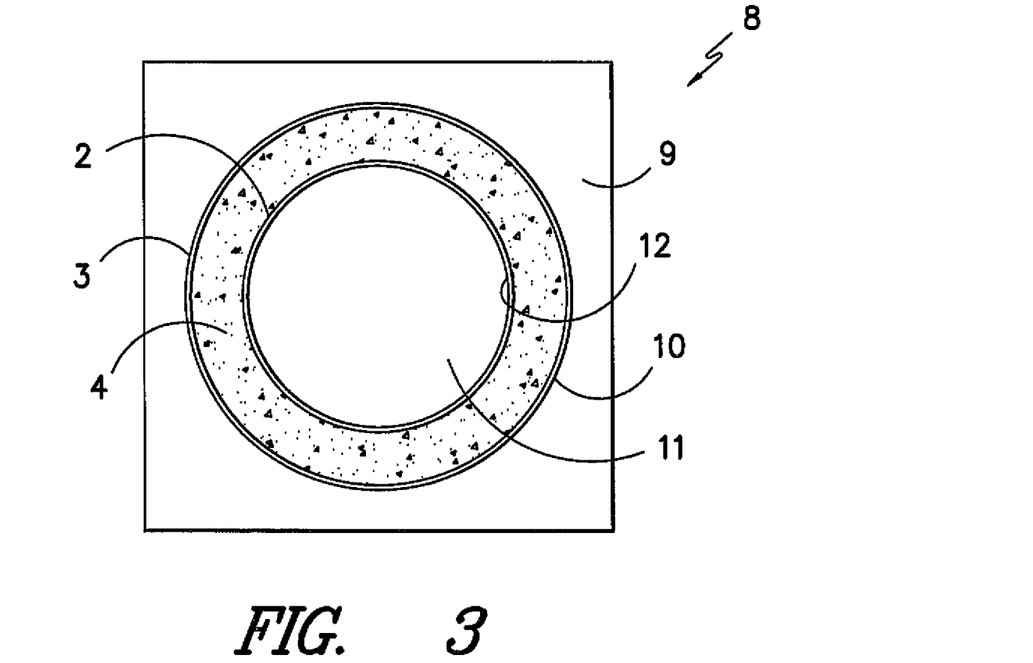
FIG. 3 is a top view of the annular reinforcement structure of FIG. 1 in an exemplary embodiment of a mold.
Figure 4:
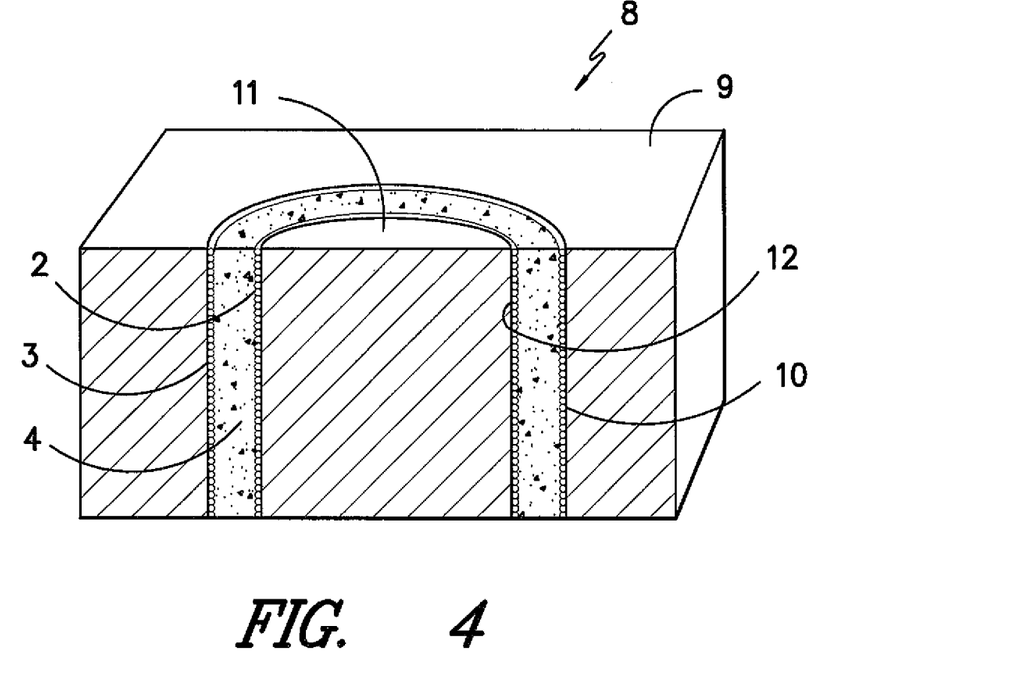
FIG. 4 is a perspective, cross-sectional view of the same.

The material for the core 4 is cast-in-place, that is, the inner and outer reinforcement bands 2 and 3 are maintained in a spaced-apart, concentric orientation, and the core material is formed in situ, Referring to FIGS. 3 and 4, an exemplary embodiment of a ring mold 8 is shown having two parts—outer mold 9 having side wall 10, corresponding to the circumference of outer reinforcement band 3, and inner mold 11 having side wall 12, corresponding to the circumference of inner reinforcement band 2. The mold 8 may be made of any suitable material and provided with finishes or coatings to promote release of the annular reinforcement structure 1 from the mold 8.

Any of a variety of techniques may be employed to maintain the alignment of the reinforcement bands 2 and 3 in the mold 8. For example, the reinforcement bands 2 and 3 may be held in place by friction, vertical ribs, steps, jigs, locating pins and combinations thereof. In one embodiment, the reinforcement bands 2 and 3 are ferrous or contain ferrous components, and the reinforcements 2 and 3 are held in place by magnets or electromagnets.

In one embodiment of the invention, the surfaces of side wall 10 of outer mold 9 and side wall 12 of inner mold 11 are coated with a resilient material. The coating may be a thermoplastic or thermoset material. By way of example, the coating may be an elastomer, in particular, silicone rubber. The advantage of a mold 8 having resilient surfaces is that the outer reinforcement band 3, the inner reinforcement band 2, or both may be pressed into the surface to create a seal. Accordingly, even if a reinforcement band 2 or 3 is permeable to the core material while it is being cast, at least a portion of the surface of the reinforcement band 2 or 3 in contact with the side of the mold 8 is prevented from being coated with core material, due to the seal created. The uncoated portion of the annular reinforced structure 1 may then be bonded to another composition, such as a matrix material, which is being reinforced.

Figure 5:
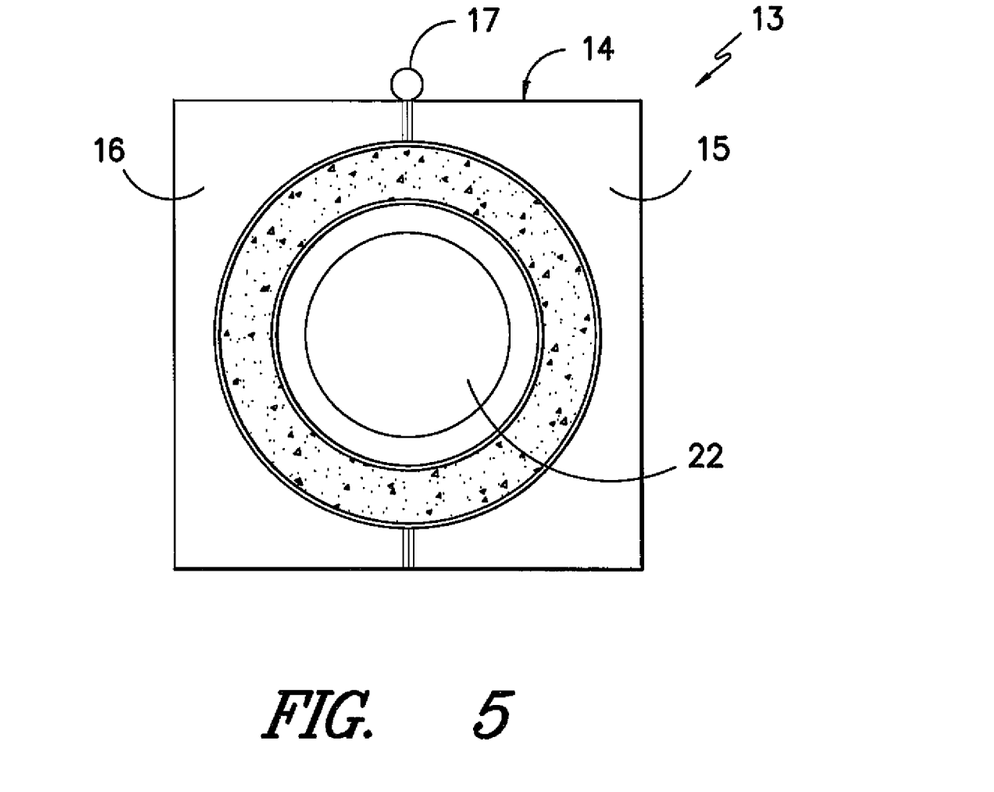
FIG. 5 is a top view of an exemplary embodiment of a mold for making an annular reinforcement structure and shows the annular reinforcement structure of FIG. 1 in place.
Figure 6:
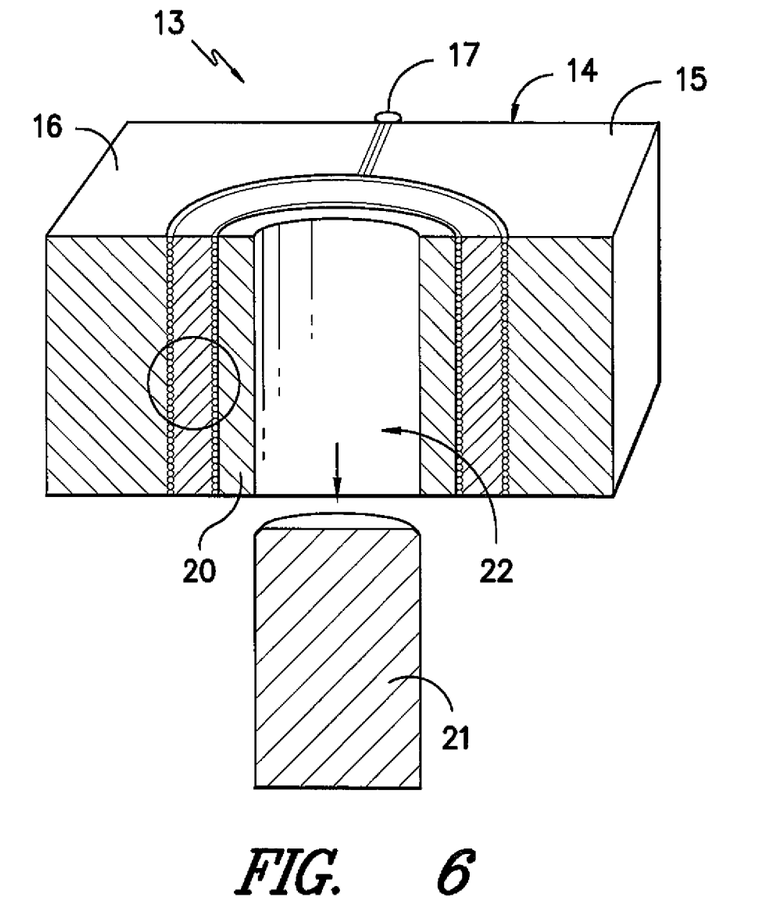
FIG. 6 is perspective, cross-sectional view of another exemplary embodiment of a mold with an exemplary reinforcement structure shown in place.
Figure 7:
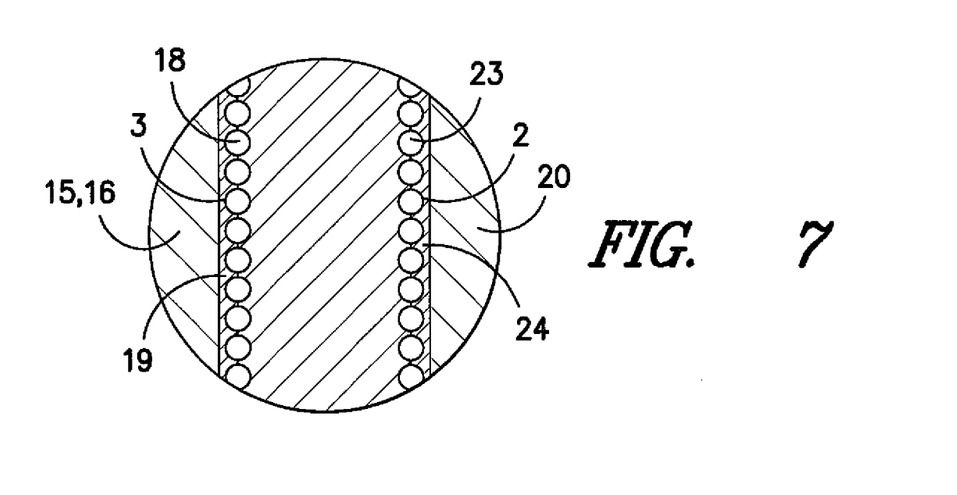
FIG. 7 is an enlargement of a side of the mold of FIG. 6 and shows a seal between the surface of the exemplary mold and inner and outer reinforcement bands.

Referring to FIGS. 5, 6, and 7, an exemplary embodiment of a mold 13 is shown having outer mold 14 having two halves, 15 and 16, joined by hinge 17. Outer mold 14 can be "clamped" around outer reinforcement band 3, such that the cords 18 are pressed into the resilient surface 19 of mold 14. The second component of mold 13 is inner mold 20, which is expandable. Inner mold 20 has a piston 21, which may be forced into the interior cavity 22 of inner mold 20, after inner reinforcement band 2 is placed over inner mold 20. Piston 21 causes inner mold 20 to expand, thereby pressing cords 23 of inner reinforcement band 2 into resilient surface 24 of inner mold 20. In the example illustrated, the outside of the outer reinforcement band 3 and the inside of the inner reinforcement band 2 would not be coated by a core material, even if the core material was cast from a low viscosity, liquid reaction mixture.

It can be understood that in many applications, it is desirable that core 4 be bonded to one side of a reinforcement band and a second material, such as a matrix material, be bonded to the opposite side of a reinforcement band. By way of example, the reinforcement band may be formed of a cord would in a helix, and the relative surface area of the portion of the cord coated by the core material and the portion of the cord coated by the matrix material may vary from 70:30 to 30:70, or even from 10:90 to 90:10, respectively.

Core Material

The inner and outer reinforcement bands are separated by a cast-in-place core 4. The material of core 4 is a solid having a density of 0.75 g/cm$^3$ or greater, a solid having a density of 0.90 g/cm$^3$ or greater, or even a solid having a density of 1.1 g/cm$^3$ or greater. The material of core 4 may be selected from a wide range of organic and inorganic materials that may be cast in place. By way of example, the core material may be a natural or synthetic polymer, including thermoplastic and thermosetting materials. In particular, the core material may be an elastomeric material, such as natural or synthetic rubber, which may be cured in situ, polyurethane, segmented copolyester, polyamide co-polymer and thermoplastic elastomers. In one embodiment of the invention, the core material is a polyurethane polymer formed without a blowing agent, that is, substantially without voids, which fills the space between the inner and outer reinforcement bands 2 and 3 and is bonded thereto. In another example, the core material is a ceramic, concrete or organometallic compound.

The nature of the core material will dictate the method of casting the core 4 into place. Accordingly, the core material may be cast as a reaction mixture capable of polymerizing, an uncured polymer capable of being cross-linked, or an inorganic plastic capable of being cured, for example a concrete which is hydrated and cured. Alternatively, the core material may be a polymer that has been melted and is allowed to cool, such as a thermoplastic resin. Various other additives may also be present in the core material, such as catalysts to promote polymerization or cross-linking, and compositions to modify the properties of the core material, such as plasticizers, as are known to those skilled in the art.

The method of making the annular reinforcement structure 1 disclosed herein for two reinforcement bands 2 and 3 and a core material 4 could be repeated with a third reinforcement band and second core material, to produce an annular reinforcement structure having three reinforcement bands, with each band separated by the same or different core materials. For example, employing the methods and apparatus disclosed herein, it is possible to first assemble an outer reinforcement band and an intermediate reinforcement band with a core material interposed between, followed by assembly of the inner reinforcement band with a second core material between the inner reinforcement band and the intermediate reinforcement band.

Reinforced Matrix Material

The annular reinforced structure 1 of the present invention may be used to reinforce a matrix material. The annular reinforced structure 1 may be covered with the matrix material, that is, the matrix material covers at least one surface of the structure, for example, the outer surface of the outer reinforcement band 3. Alternatively, the annular reinforced structure 1 may be embedded in the matrix material. In still another embodiment of the invention, a first matrix material may be bonded to the outer surface of the outer reinforcement band 3 and a second material may be bonded to the inner surface of the inner reinforcement band 2.

Figure 8:
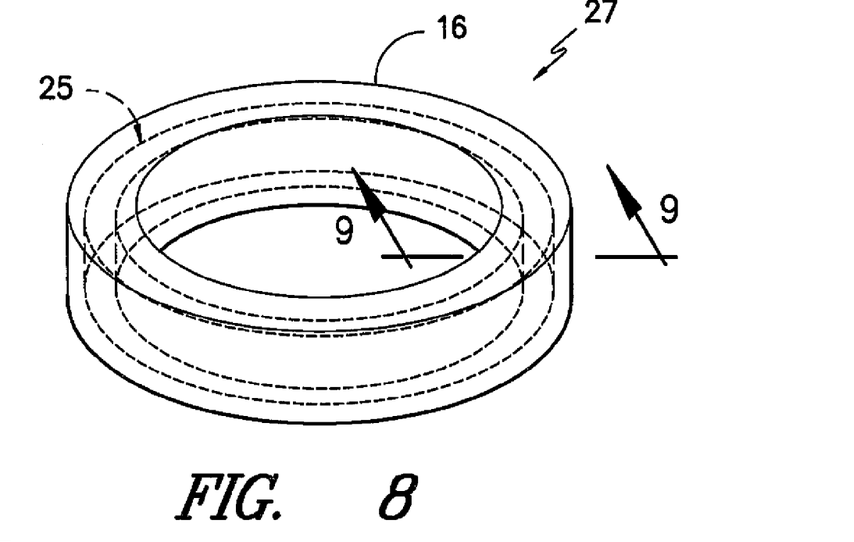
FIG. 8 is a top perspective view showing an exemplary embodiment of an annular reinforcement structure embedded in a matrix material.
Figure 9:
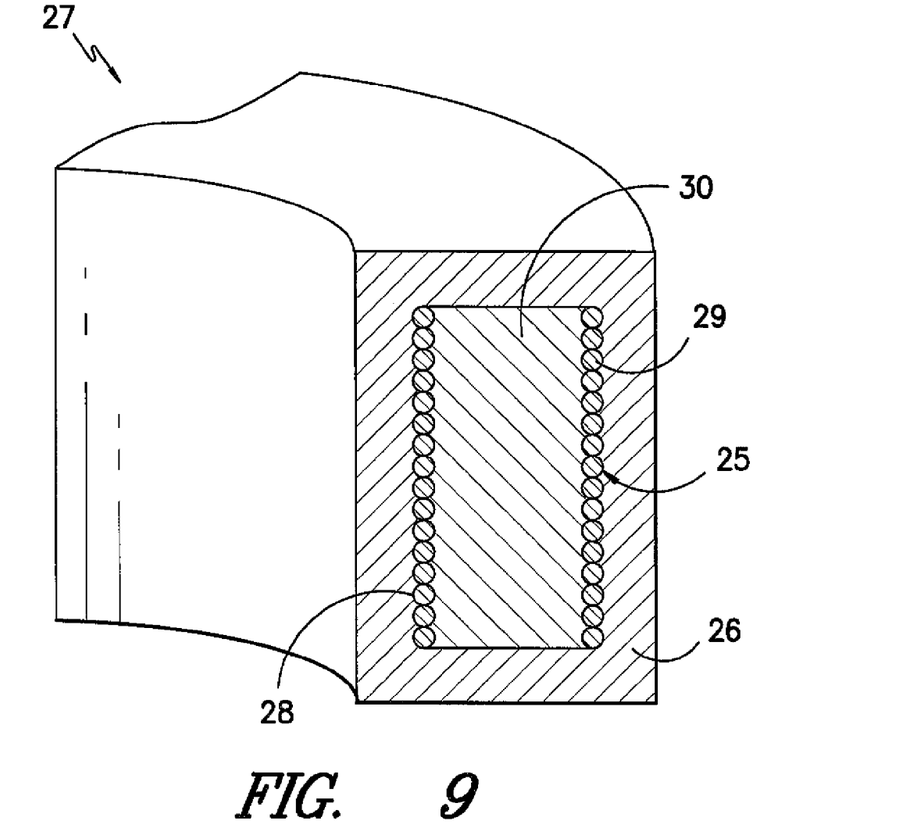
FIG. 9 is a side, cross-section view of the exemplary embodiment of FIG. 8.

Referring to FIGS. 8 and 9, another exemplary embodiment of an annular reinforcement structure 25 is shown embedded in a matrix material 26, to create reinforced ring 27. A cross-section of reinforced ring 27 is shown in FIG. 9, which also shows annular reinforcement structure 25 with inner reinforcement band 28, outer reinforcement band 29, and core 30.

The matrix material may be selected from a wide range of organic and inorganic materials, especially those that may be cast with an annular reinforcement structure embedded therein. By way of example, the matrix material may be a natural or synthetic polymer, including thermoplastic and thermosetting materials. Of particular interest are elastomeric matrix materials, such as natural or synthetic rubber, polyurethane, segmented copolyester, polyamide co-polymer and thermoplastic elastomers. In one embodiment of the invention, the material used for the core 4 is a polyurethane polymer and the matrix material 26 is a polyurethane polymer, both formed without a blowing agent, that is, substantially without voids. In another example, the matrix material is a ceramic, concrete or organometallic compound.

Non-Pneumatic Wheel

Figure 10:
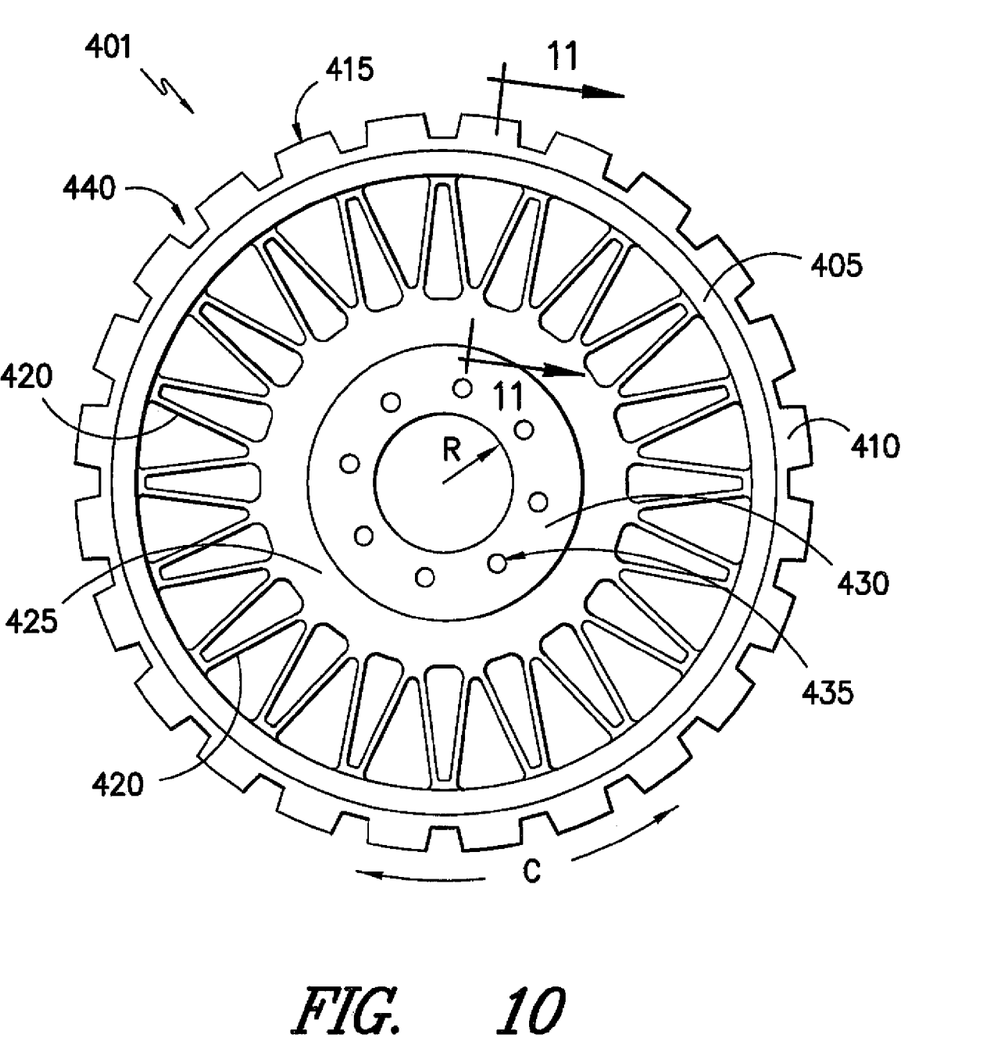
FIG. 10 is a perspective view of an exemplary embodiment of a non-pneumatic wheel of the present invention.
Figure 11:
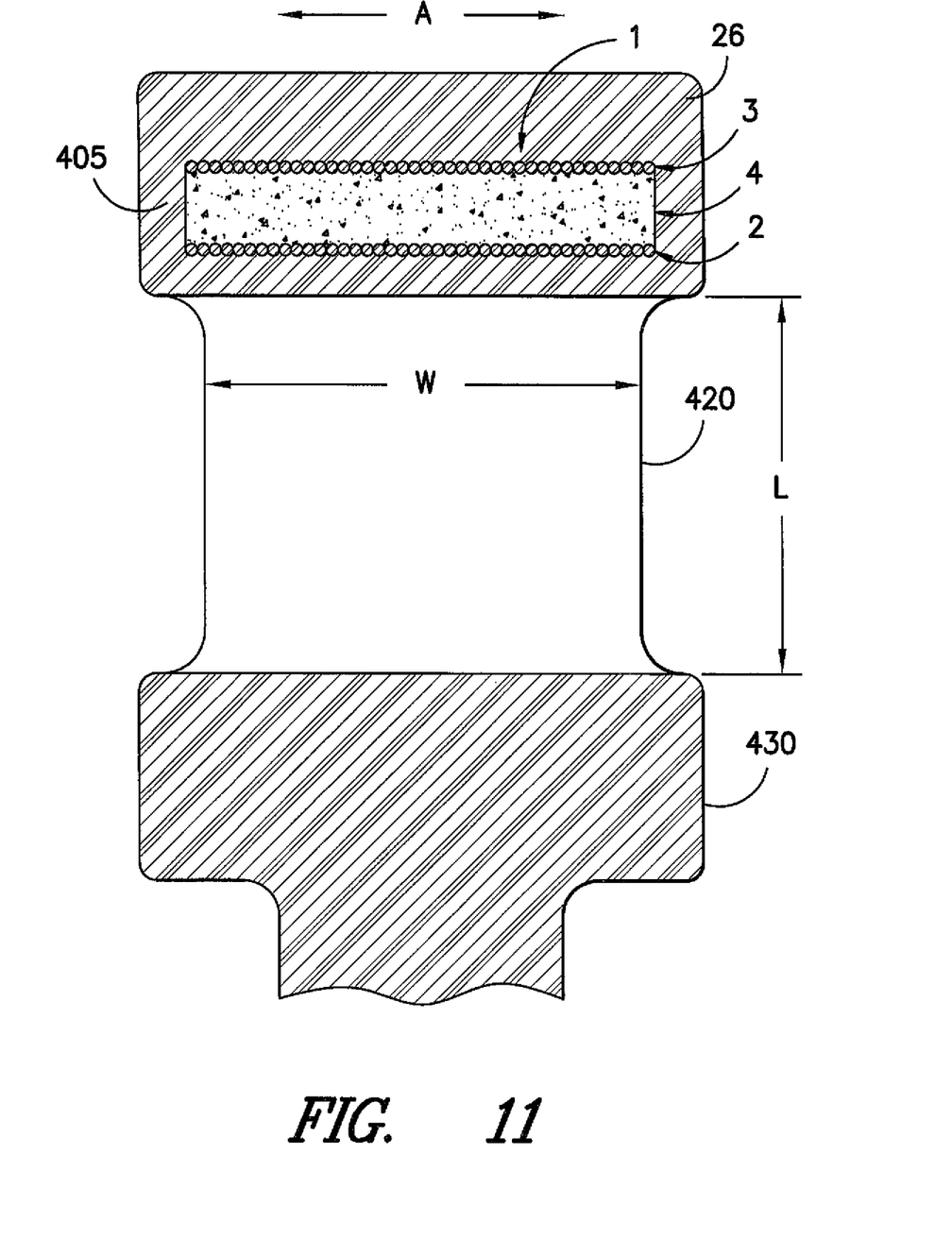
FIG. 11 is a partial, cross-sectional view of the exemplary embodiment of FIG. 11, taken along line 11-11, and incorporating an exemplary annular reinforcement structure such as that shown in FIG. 1.

Embodiments of the annular reinforcement such as e.g., annular reinforcements 1 and 25, may be used to create a non-pneumatic wheel or tire. FIG. 10 provides a perspective view of an exemplary embodiment of a structurally supported wheel 401 in accordance with the present invention. As used herein, structurally supported means that the tire carries a load by its structural components without the support of a gas inflation pressure. FIG. 11 provides a partial, cross-sectional view of wheel 401 taken along line 11-11 as shown in FIG. 10. Arrows C denote the circumferential direction. Arrow R denotes the radial direction. Arrows A denotes axial direction, also referred to sometimes as the transverse or lateral direction.

Referring now more particularly to FIG. 10, annular reinforcement structure 1 is positioned within a band 405 extending about circumferential direction C. For this exemplary embodiment, annular reinforcement structure 1 is constructed as previously described. In addition, other constructions such as e.g., annular reinforcement structure 25 or constructions having multiple cores 4 may be used as previously indicated. For wheel 401, bands 2 and 3 provide e.g., vertical stiffness for wheel 401 while core 4 assists in providing for a shear layer for wheel 401 as will be further described.

In accordance with the invention, wheel 401 is useful in applications where the traction, steering, or suspension qualities of a pneumatic tire are advantageous or in need of improvement. A structurally supported wheel 401 constructed in accordance with the present invention as more fully described below can offer improved compliance and stiffness characteristics, in a wheel requiring less maintenance than a pneumatic tire. In addition to use on motor vehicles, such a wheel could also be advantageously used, for example, on a wheel chair, a gurney, a hospital bed, a cart for sensitive equipment, or other vehicles or conveyances where sensitivity to shock is important. In addition, the wheel may be used in place of casters for chairs or other furniture, or as wheels for baby carriages, skate boards, in-line skates, etc. Wheel 401 of the invention could be used in machines or apparatuses where load bearing or load applying wheels are used. The term "vehicle" is used below for the purposes of the description; however, any device on which compliant wheels could be mounted is included in the following description and "vehicle" should be understood to include the same.

Figure 12:
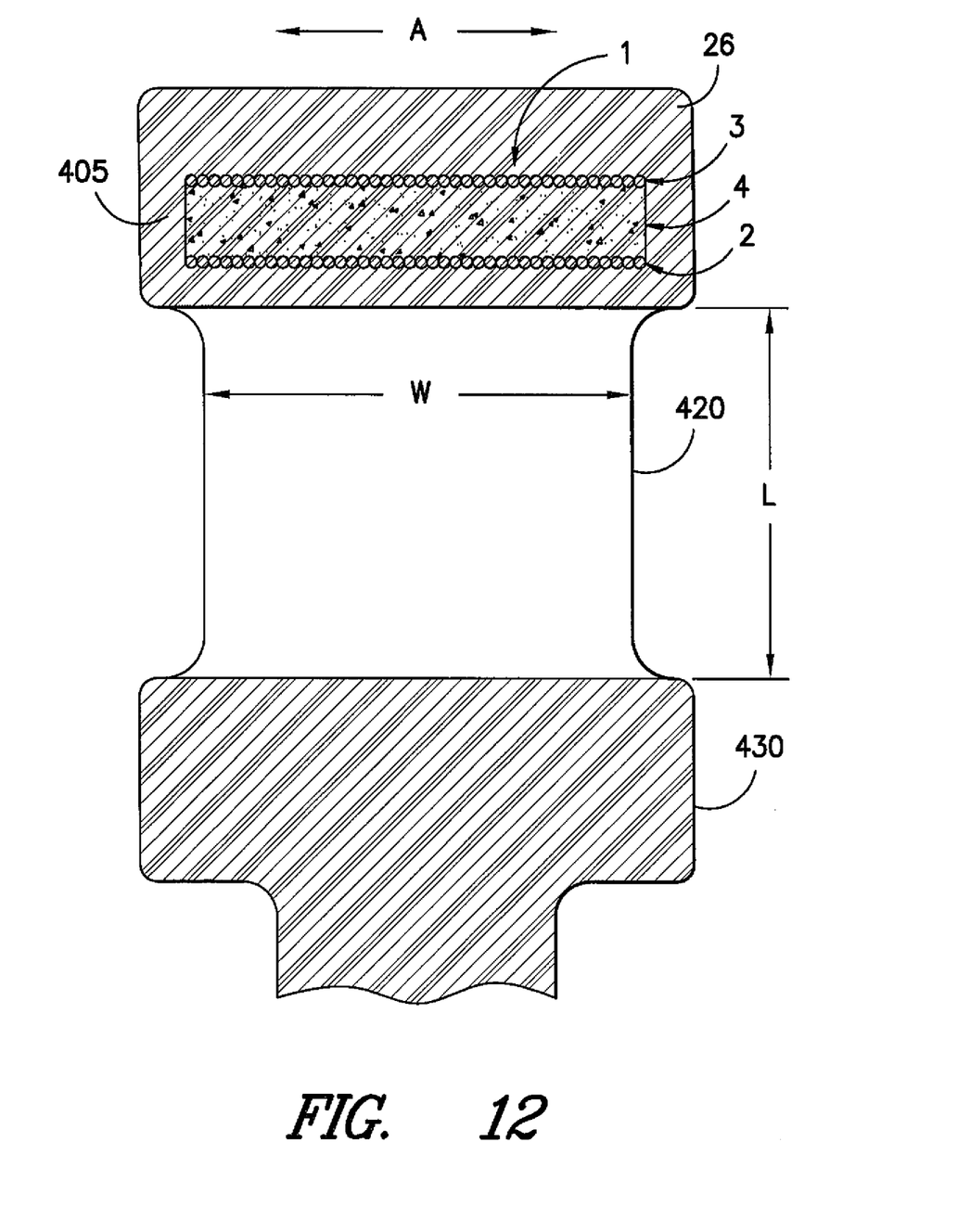
FIG. 12 is a partial, cross-sectional view of the exemplary embodiment of FIG. 11, taken along line 11-11, and incorporating another exemplary annular reinforcement structure of the present invention.

Wheel 401 as shown in FIGS. 11 and 12 has an annular band 405 and a plurality of tension transmitting elements, illustrated as web spokes 420, extending transversely across and inward from band 405, to a mounting band 425 at the radially inner end of the web spokes 420. Mounting band 425 anchors wheel 401 to a hub 430 with holes 435 for mounting. A tread portion 410 is formed at the outer periphery of band 405. Tread portion 410 may be an additional layer bonded on the band 405 as shown in FIG. 11, for example, so as to provide different traction and wear properties than the material used to construct band 405. Alternatively, tread portion 410 may be formed as part of the outer surface of the compliant band 405. Tread features may be formed in the tread portion 410 and may include blocks 415 and grooves 440.

As mentioned, web spokes 420 in the exemplary embodiment of FIGS. 10 and 11 extend transversely across wheel 401, which as used herein means that the web spokes 420 extend from side to side of wheel 401 and may be aligned with the axis of rotation, or may be oblique to the wheel axis. Further, "extending inward" means that web spokes 420 extend between band 405 and mounting band 425, and may lie in a plane radial to the wheel axis or may be oblique to the radial plane. In addition, as shown in FIG. 10, web spokes 420 may actually include spokes at different angles to the radial plane. Various shapes and patterns may be used as shown, e.g., in U.S. Pat. No. 7,013,939.

Band 405 supports the load on wheel 401 and resiliently deforms to conform to the road (or other supporting surface) to provide traction and handling capabilities. More particularly, as described in U.S. Pat. No. 7,013,939, when a load is placed on the wheel 401 through hub 430, band 405 acts compliantly in that it bends and otherwise deforms for ground contact and forms a contact patch, which is the portion of wheel 401 that is in contact with the ground under such load. The portion of band 405 that is not in ground contact acts in a manner similar to an arch and provides a circumferential compression stiffness and a longitudinal bending stiffness in the equatorial plane sufficiently high to act as a load-supporting member. As used herein, "equatorial plane" means a plane that passes perpendicular to the wheel axis of rotation and bisects the wheel structure.

The load on the wheel 401, transmitted from the vehicle (not shown) to hub 430 essentially hangs by web spokes 420 attached to the load supporting portion of band 405. Web spokes 420 in the ground contacting region do not experience tensile loading due to the load. As wheel 401 rotates, of course, the specific portion of the compliant band 405 acting as an arch continually changes, however, the concept of an arch is useful for understanding the load supporting mechanism. The amount of bending of band 405, and accordingly, the size of the contact patch is proportional to the load. The ability of band 405 to bend resiliently under the load provides a compliant ground contact area that acts similar to that of a pneumatic tire, with similar advantageous results.

For example, band 405 can envelop obstacles to provide a smoother ride. Also, band 405 is able to transmit forces to the ground or road for traction, cornering, and steering. By contrast, in typical solid and cushion tires, the load is supported by compression of the tire structure in the contact area, which includes compression of the cushion material under the rigid hub. Compliance of the cushion material is limited by the compression properties of the material and the thickness of the material on the rigid wheel or hub. Examples of non-pneumatic wheels using compliant bands can also be found in U.S. Pat. Nos. 6,769,465 B2 and 7,650,919 B2.

Still referring to FIGS. 10 and 11, web spokes 420 are substantially sheet-like elements having a length L in the radial direction, a width W in the axial direction corresponding generally to the axial width of the compliant band 405, although other widths W may be used including widths W that vary along the radial direction as shown in FIG. 11. Web spokes 420 also have a thickness (i.e. a dimension perpendicular to length L and width W) that is generally much less than either the length L or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 420 is increased, the web spokes may provide some compressive load bearing force in the ground contact area. The predominant load transmitting action of web spokes 420 as a whole, however, is in tension. The particular web spoke thickness may be selected to meet the specific requirements of the vehicle or application.

As seen in FIG. 11, preferably, web spokes 420 are oriented relative to the compliant band 405 across the axial direction A. Tension in web spokes 420 is, therefore, distributed across band 405 to support the load. By way of example, web spokes 420 may be formed of an elastomeric material having a tensile modulus of about 10 to 100 MPa. Web spokes 420 may be reinforced if desired. The material used to construct web spoke material 420 should also exhibit elastic behavior to return to original length after being strained to e.g., 30%, and to exhibit constant stress when the web spoke material is strained to e.g., 4%. Further, it is desirable to have a material with a tan δ of not more than 0.1 at the relevant operating conditions. For example, commercially available rubber or polyurethane materials can be identified which meet these requirements. By way of further example, Vibrathane B836 brand urethane from Chemtura Corporation of Middlebury, Conn. has been suitable for construction of web spoke 420.

For the exemplary embodiment of FIGS. 10 and 11, web spokes 420 are interconnected by radially inner mounting band 425, which encircles the hub 430 to mount wheel 401 to the hub 430. Depending on the construction materials and manufacturing process, hub 430, mounting band 425, annular band 405, and web spokes 420 may be molded as single unit. Alternatively, one or more of such components may be formed separately and then attached to each other through e.g., adhesives or molding. Additionally, other components may be included as well. For example, an interface band can be used to connect web spokes 420 at their radially outer ends, and then the interface band would be connected to band 405.

According to a further embodiment, web spokes 420 could be mechanically attached to hub 430, for example, by providing an enlarged portion on the inner end of each web spoke 420 that engages a slot device in hub 430, or by attaching adjacent web spokes 420 to form a loop at a hook or bar formed in hub 430.

Substantially purely tensile load support is obtained by having a web spoke 420 that has high effective stiffness in tension but very low stiffness in compression. To facilitate bending in a particular direction, web spokes 420 may be curved. Alternatively, web spokes 420 can be molded with a curvature and straightened by thermal shrinkage during cooling to provide a predisposition to bending in a particular direction.

Web spokes 420 should resist torsion between annular band 405 and hub 430, for example, when torque is applied to wheel 401. In addition, web spokes 420 should resist lateral deflection when, for example, turning or cornering. As will be understood, web spokes 420 that lie in the radial-axial plane, that is, are aligned with both the radial and axial directions, will have high resistance to axially directed forces, but, particularly if elongated in the radial direction R, may have relatively low resistance to torque in the circumferential direction C. For certain vehicles and applications, for example, those producing relatively low torque, a web spoke package having relatively short spokes 420 aligned with the radial direction R will be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial and the circumferential directions, thus adding resistance to torque, while retaining radial and lateral force-resisting components. The angle of orientation may be selected depending on the number of web spokes used and the spacing between adjacent web spokes. Other alternative arrangements may also be used.

One advantage of the compliant wheel of the invention is that the selection of the size and arrangement of band 405 and web spokes 420 allows the vertical, lateral, and torsional stiffness of the wheel to be tuned independently of the contact pressure and of each other. The operating parameters of band 405, load carrying and compliance, are determined in part by selection of materials having the circumferential compression stiffness and longitudinal bending stiffness in the equatorial plane to meet the design load requirements. These parameters are examined in view of the diameter of wheel 401, the width of annular band 405 in the axial direction A, the thickness of band 405 in radial direction R, and the length and spacing of web spokes 420. The number of web spokes is selected to maintain circularity of band 405, and will depend also on the spacing between adjacent web spokes 420.

Continuing with FIG. 11, as previously indicated, band 405 includes an annular reinforcement structure 1. Band 405 may be e.g., molded integrally as part of non-pneumatic wheel 401 or constructed separately and then attached with the other elements of wheel 401. For example, in one exemplary method of manufacturing wheel 401, an annular reinforcement structure such as e.g., structure 1 is constructed using one or more methods previously described to position core 4 between annular reinforcing bands 2 and 3. The resulting assembly (FIGS. 1 and 2) is placed into a mold and cast as band 405, which can then be connected to other elements of wheel 401 such as web spokes 420. For examples, casting of band 405 may include placement of a matrix material into the mold that may impregnate core 4.

Alternatively, and by way of further example, reinforcing structure 1 may be placed into a mold and cast as wheel 401. For example, annular reinforcement 1 can be placed into a wheel mold that provides one or more cavities defining spokes 420, mounting band 425, and hub 430. Alternatively, hub 430 may be formed separately and configured for receipt of the molded mounting band 425. A matrix material is then provided into the mold to form the features (e.g., spokes, band, etc.) of a non-pneumatic wheel such as e.g., wheel 401. The matrix material may also impregnate core 4 and potentially annular reinforcement bands 2 and 3 as previously discussed. FIG. 11 illustrates the use of annular reinforcement band 1 where matrix material 26 forming band 405 has not permeated into core 4 whereas FIG. 12 illustrates an annular reinforcement band 1 where the matrix material has permeated core 4. By way of example, a matrix material suitable for such construction includes e.g., Vibrathane B836 brand urethane from Chemtura Corporation of Middlebury, Conn.

The resulting casting of wheel 401 is then provided with a tread band or tread portion 410 to complete the process of manufacturing a structurally supported, non-pneumatic wheel. In an exemplary alternative method of the present invention, the casting of the annular reinforcement structure could be positioned in tread portion 410 using an interference fit before placing both into a wheel mold of the desired configuration. Such a method could help eliminate interference issues between the spokes 420 and/or band 425 during loading and closing of the wheel mold.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of manufacturing a non-pneumatic tire having an annular reinforcement structure that includes an inner reinforcement band, an outer reinforcement band; and a core positioned between the inner and outer reinforcement bands, the method comprising the steps of:

providing the inner and outer reinforcement bands in a first mold with the inner and outer reinforcement bands positioned in concentric, spaced relationship so as to form an annular space between the inner and outer reinforcement bands;

inserting material for the core into the first mold into the space between the inner and outer reinforcement bands so as to provide a casting that includes a core having a density of 0.75 g/cm³ or greater that is located between the inner and outer reinforcement bands;

placing the casting from said step of inserting into a second mold, the second mold providing at least one cavity for the molding of one or more features of the non-pneumatic wheel; and introducing a matrix material in the second mold so as to form one or more features of the non-pneumatic wheel.

2. A method of manufacturing a non-pneumatic tire as in claim 1, wherein the outer reinforcement band has an outside surface, and wherein the material used for the core does not coat the outside surface of the outer reinforcement band.

3. A method of manufacturing a non-pneumatic tire as in claim 1, wherein the inner reinforcement band has an inside surface, and wherein the material used for the core does not coat the inside surface of the inner reinforcement band.

4. A method of manufacturing a non-pneumatic tire as in claim 1, wherein the material for the core that is used in said step of inserting is selected from the group consisting of thermoplastic polymers, thermosetting polymers, ceramic, concrete and organometallic compounds.

5. A method of manufacturing a non-pneumatic tire as in claim 1, wherein said step of inserting results in casting where the core has a density of 0.90 g/cm3 or greater.

6. A method of manufacturing a non-pneumatic tire as in claim 1, wherein the outer reinforcement band has an outer surface, and wherein the first mold comprises a side wall having a resilient surface configured for contact with the outer surface of the outer reinforcement hand such that when the outer surface is pressed into the resilient surface of the side wall a seal is created that prevents the material for the core from coating the outside surface of the outer reinforcement band during said step of inserting.

7. A method of manufacturing a non-pneumatic tire as in claim 1, wherein the outer reinforcement band is comprised of a cord selected from the group consisting of monofilament or multi-filament yarns, and the cord is wound into a helix making at least three revolutions.

8. A method of manufacturing a non-pneumatic tire as in claim 1, wherein the inner reinforcement band has an inner surface, and Wherein the first mold comprises a side wall having a resilient surface configured for contact with the inner surface of the inner reinforcement band such that when the inner surface is pressed into the resilient surface of the side wall a seal is created that prevents the material for the core from coating the inner surface of the inner reinforcement band during said step of inserting.

9. A method of manufacturing a non-pneumatic tire as in claim 1, wherein the inner reinforcement band is comprised of a cord selected from the group consisting of monofilament or multi-filament yarns, and the cord is wound into a helix making at least three revolutions.

10. A method of manufacturing a non-pneumatic tire as in claim 1, wherein the material for the core used in said step of inserting is introduced into the space between the inner and outer reinforcement bands as a liquid reaction mixture capable of polymerizing.

11. A method of manufacturing a non-pneumatic tire as in claim 10, wherein the outer reinforcement band is impermeable to the liquid reaction mixture.

12. A method of manufacturing a non-pneumatic tire as in claim 10, wherein the inner reinforcement band is impermeable to the liquid reaction mixture.

13. A method of manufacturing a non-pneumatic tire as in claim 1, wherein said step of inserting provides a casting where the core comprises an elastomeric material and has a density of 0.90 g/cm3 or greater.

14. A method of manufacturing a non-pneumatic tire as in claim 1, wherein the material for the core used in said step of inserting is selected from the group consisting of thermoplastic and thermosetting polymers.

15. A method of manufacturing a non-pneumatic tire as in claim 1, wherein the material for the core used in said step of inserting comprises a polyurethane having a density of 0.90 g/cm3 or greater.

16. A method of manufacturing a non-pneumatic tire as in claim 1, wherein the matrix material used in said step of introducing is selected from the group consisting of thermoplastic polymers, thermosetting polymers, ceramic, concrete and organometallic compounds.

17. A non-pneumatic wheel, the wheel defining radial and circumferential directions, the wheel comprising:

an annular band for supporting a ground contacting tread portion, said annular hand extending about the circumferential direction;

an annular reinforcement structure positioned within said annular band, said reinforcement structure comprising:
an inner reinforcement band extending along the circumferential direction;
an outer reinforcement band extending along the circumferential direction and positioned radially-outside of said inner reinforcement band;
a core positioned at least partially between said inner and outer reinforcement bands, said core being constructed from a material that is formed in place between said inner and outer reinforcement bands and has a density of 0.75 g/cm3 or greater;

a mounting band positioned radially-inward of said annular band; and a plurality of web spokes connected between said annular band and said mounting band.

18. A non-pneumatic wheel as in claim 17, wherein the inner reinforcement band is comprised of a cord selected from the group consisting of monofilament or multi-filament yarns, and the cord is wound into a helix making at least three revolutions.

19. A non-pneumatic wheel as in claim 17, wherein said core is impregnated with a matrix material that is selected from the group consisting of thermoplastic polymers, thermosetting polymers, ceramic, concrete and organometallic compounds.

20. A non-pneumatic wheel as in claim 17, wherein said core is impregnated with a matrix material that comprises a polyurethane.

* * * * *